United States Patent [19]

Matsumoto et al.

[11] Patent Number: 5,684,765
[45] Date of Patent: Nov. 4, 1997

[54] OPTICAL RECORDING METHOD AND CONTROL

[75] Inventors: Hiroyuki Matsumoto, Tokyo; Shinichi Kurita; Koichiro Ishii, both of Kanagawa; Masashi Horikawa, Tokyo, all of Japan

[73] Assignee: Nikon Corporation, Tokyo, Japan

[21] Appl. No.: 623,150

[22] Filed: Mar. 28, 1996

[30] Foreign Application Priority Data

| Mar. 28, 1995 | [JP] | Japan | 7-070166 |
| Mar. 28, 1995 | [JP] | Japan | 7-070167 |
| Mar. 28, 1995 | [JP] | Japan | 7-070168 |
| Aug. 29, 1995 | [JP] | Japan | 7-219989 |

[51] Int. Cl.$^6$ .................................................. G11B 11/00
[52] U.S. Cl. ........................... 369/13; 369/54; 369/116
[58] Field of Search ........................... 369/13, 14, 54, 369/116, 110, 58; 360/59, 114; 365/122

[56] References Cited

U.S. PATENT DOCUMENTS

| 5,132,956 | 7/1992 | Ichikawa | 369/58 |
| 5,239,524 | 8/1993 | Sato et al. | 369/13 |
| 5,255,270 | 10/1993 | Yanai et al. | 369/58 |
| 5,341,359 | 8/1994 | Birukawa et al. | 369/13 |
| 5,341,360 | 8/1994 | Johann et al. | 369/116 |
| 5,428,586 | 6/1995 | Kobayashi et al. | 369/13 |
| 5,485,433 | 1/1996 | Satomura et al. | 369/13 |
| 5,517,471 | 5/1996 | Ashinuma et al. | 369/13 |

FOREIGN PATENT DOCUMENTS

| 0 420 211 A3 | 4/1991 | European Pat. Off. . |
| 0 543 580 A3 | 5/1993 | European Pat. Off. . |

OTHER PUBLICATIONS

"In Search of a Direct Overwrite," Computer Technology Review, vol. 12, No. 11, Sep. 1992, p. 36.

*Primary Examiner*—Tan Dinh
*Attorney, Agent, or Firm*—Oliff & Berridge

[57] ABSTRACT

A control and method of overwrite optical recording with a first recording data transmission speed. In accordance with the method data which has been written, is verified for errors. When the number of errors exceeds a predetermined level, the data is re-recorded at the same location. The re-recording is either: 1) conducted with the same conditions; 2) conducted with a higher low level laser beam intensity; 3) conducted with the low level and high level laser beam intensities reversed; or 4) conducted after conducting a test recording and resetting the laser beam modulation intensity.

18 Claims, 4 Drawing Sheets

OPTICAL RECORDING METHOD AND CONTROL

BACKGROUND OF THE INVENTION

1. Field of the Invention

The present invention relates to a control and method for recording data on an overwritable optical recording medium. The control and method effectively replace previously recorded data, regardless of the location of the data on the recording medium.

2. Description of Related Art

In recent years, optical recording and retrieval methods have become well known. These optical recording and retrieval methods satisfy a variety of needs, such as: high density; large capacity; high access speed; and high recording; and retrieval speeds. Also, the recording devices, retrieval devices and recording media, which employ the above optical recording and retrieval methods, have become more well-known.

There are several known optical recording and retrieval methods. These include optical recording and retrieval methods that: 1) form holes in the recording medium using heat; 2) change phases; and 3) use magnetooptical principles. Phase change and magnetooptical methods can 1) erase data after data has been recorded; 2) record new data; and 3) repeat the process numerous times. These phase change and magnetooptical methods are widely used, for example, such as in external memories for computers and consumer audio equipment.

Until recently, it has been impossible to replace or "overwrite" previously recorded data with optical and retrieval methods. Overwriting consists of recording new information on a medium that has data already been recorded on without first erasing the data, i.e., the data is essentially replaced by overwriting. However, an optical recording method has been proposed where overwriting is achieved by modulating the intensity of a beam that irradiates a recording medium. The modulation is based on the digitized data that will be recorded. Further, overwritable optical recording media and recording devices, which are capable of overwriting using the above methods are also known For example, U.S. Pat. No. 5,239,524 (equivalents include Japanese Laid-Open Patent Publication Sho 62-175948 and DE 3,619,618A1) disclose this type of overwriting magnetooptical recording methods.

In U.S. Pat. No. 5,239,524, the contents of which are fully incorporated herein, an overwritable or magnetooptical recording medium is used in magnetooptical recording and retrieval. The magnetooptical medium comprises a plurality of magnetic layers, each layer having at least one perpendicularly arranged magnetic layer as the recording layer. The magnetic layer is comprised of any suitable material, such as, for example, amorphous TbFe, TbFeCo, GdFe, GdFeCo, DyFe, or DyFeCo, and the like.

The recording medium used in the magnetooptical recording of U.S. Pat. No. 5,239,524 is an overwritable multi-layer magnetooptical recording medium containing a memory layer or M layer that functions as a recording and retrieval layer, and a supplementary recording layer or W layer. The memory layer M comprises a vertically magnetizable magnetic film. The supplementary recording layer W also comprises a vertically magnetizable magnetic film. Therefore, the data, which is usually stored on both the supplementary recording layer W and the memory layer M, for example stored as bits, can be exchange-coupled, as explained in U.S. Pat. No. 5,239,524, if desired. During a room temperature exchange-couple process, the magnetic orientation of data on the memory layer M does not change, and the magnetization of the data on the supplementary recording layer W will be oriented in a preset orientation as the auxiliary recording layer W has a lower holding power force or coercivity Hc at room temperature, and a higher curie point Tc, than the memory layer M, as discussed in U.S. Pat. No. 5,239,524.

Further, data can be recorded on the memory layer M, and possibly also on the auxiliary recording layer WO. The recording of data on the separate layers is conducted by the data being magnetized in the vertical direction or "A" orientation, and data being magnetization in an opposite direction or "anti-A" orientation, as discussed in U.S. Pat. No. 5,239,524. The magnetooptical recording medium permits the magnetic orientation of the auxiliary recording layer W to be aligned in a single direction by a magnetic field means, for example such as an initializing auxiliary magnetic field, Hini. The magnetic orientation of the memory layer M is not reversed at this time. Furthermore, the magnetic orientation of the auxiliary recording layer W, which has been previously aligned in a single direction, is not reversed, even under the exchange-coupling force exerted by the memory layer M. The magnetic orientation of the memory layer M is not reversed, even under an exchange-coupling force exerted by the auxiliary recording layer W.

With the magnetooptical recording method as discussed in U.S. Pat. No. 5,239,524, only the magnetic orientation of the auxiliary recording layer W is aligned in a single direction by magnetic field means prior to recording data. Additionally, a laser beam, which has its pulse modulated based on digitized data, irradiates the recording medium, where the laser beam intensity is varied between a high level $P_H$ and a low level $P_L$, as explained in U.S. Pat. No. 5,239,524. These levels correspond to a high and low level of the laser beam's pulse. The low level is higher than a retrieval level $P_R$ with which the medium is irradiated during a retrieval step.

As discussed in U.S. Pat. No. 5,239,524, the laser is turned on at an "extremely low level" to access a predetermined recording location on the medium, even when recording is not going to occur. This extremely low level is the same as or very close to the retrieval level $P_R$. When a low level laser beam irradiates the recording medium at a temperature, the magnetic orientation of the auxiliary recording layer W does not change. The magnetic orientation of the memory layer M is affected to remove any magnetic barriers between the memory layer M and the auxiliary recording layer W. This is a low temperature process, and the temperature range at which this low temperature process occurs is a low temperature process temperature $T_L$.

On the other hand, at a higher temperatures where a high level laser beam irradiates the recording medium, the magnetic orientation of the auxiliary recording layer W becomes aligned with the direction of the recording magnetic field. The magnetic orientation of the memory layer M is affected to remove any magnetic barriers between the memory layer M and the auxiliary recording layer W. This is called a high temperature process, and the temperature range at which this high temperature process occurs is called a high temperature process temperature $T_H$.

After irradiation by the laser beam, the magnetic orientation of the auxiliary recording layer W, which had been aligned with the direction of the recording magnetic field by high level laser beam irradiation, is realigned with the magnetic orientation of the recording magnetic field. Accordingly, if the magnetic orientation of the magnetic field means and the magnetic orientation of the recording field are opposed, it is possible to repeatedly record or overwrite on the memory layer, even if data has been previously recorded. This is the principle of light modulation magnetooptical recording. In other words, the recorded data or bits are formed by high level laser beam irradiation, and the data or bits are replaced by low level laser beam irradiation. Thus, the new data replaces or "overwrites" of the old data.

When actually recording on an optical recording medium, the recording can be conducted using an optical head that is positioned in the region of the recording medium where recording occurs. The recording medium is irradiated while modulating the laser beam intensity based on the digitized data. However, there is a possibility that the recording will not be correctly conducted, and erroneous information will be recorded. The erroneous recording may be due to generated noise, the temperature of the environment, the servo capabilities of the optical head, poor erasing, and/or replacing of the previously recorded data and the like. Conventionally, erroneous recording was prevented by immediately retrieving the recorded data, and then verifying whether the recording was properly conducted. Moreover, with conventional optical recording, when the recording was determined to be erroneous, the region where the data was recorded must be erased. Thus, the recording of data must be re-conducted. Therefore, the transmission speed for recording data was slow.

Poor replacement or "overwriting" of data during optical modulation overwrite recording can be caused by several different reasons. In general, poor replacement of data can be caused by: 1) portions of data remaining in peripheral areas of the recording medium because the previously recorded data was recorded askew from the center of the track; 2) the recorded data had a width larger than a predetermined width; or 3) the laser beam used to record data was shifted from the center of a recording track during recording. If overwrite recording is conducted numerous times, the old data will be ultimately replaced. However, this is time consuming, costly and inefficient.

SUMMARY OF THE INVENTION

In order to solve the above and other problems, according to one object of the invention, an optical recording control and method for an overwritable optical recording medium are provided, where data has been recorded on an overwritable optical recording medium. The recorded data is verified, and if the number of errors determined during verification exceeds a predetermined number of errors, the data is re-recorded at the same location on the recording medium without erasing the original data. The optical recording medium is a magnetooptical recording medium that includes at least two magnetic layers, which will be mutually exchange-coupled if the number of re-recording tries indicates that particular sector of the recording medium is a bad sector.

In accordance with another object of the invention, an optical recording method and control for an overwritable optical recording medium are provided, where data has been recorded on the overwritable optical recording medium. The recorded data is verified, and if number errors determined during the verification exceeds a predetermined number of errors, the data is re-recorded with a low level laser beam intensity in the next recording cycle. The low level laser beam intensity used to re-record data is higher than during the previous recording. This cycle repeats itself, if necessary, incrementally increasing the laser beam's intensity. The low level laser beam intensity used in the re-recording step is 2–20% higher than a previous recording, and preferably between 5 and 15% higher. However, at no time should the recording intensity be greater than 20% higher than the initial recording intensity. If the recording intensity as increased would be greater than 20% higher than the original, the control indicates that sector of the recording medium to be a bad sector. The optical recording medium is a magnetooptical recording medium includes at least two magnetic layers, which are mutually exchange-coupled if the number of re-recording tries indicates that sector of the recording medium is a bad sector.

According to a further object of the invention, an optical recording method and control for an overwritable optical recording medium are provided, where data has been recorded on the overwritable optical recording medium. The recorded data is verified, and if the number of errors determined during verification exceeds a predetermined number of errors, the data is re-recorded with low level and high level laser beam intensities reversed from the previous recording. The optical recording medium is a magnetooptical recording medium that contains at least two magnetic layers that are mutually exchange-coupled if the number of re-recording retries indicates that that sector of the recording medium is a bad sector.

Yet another object of the invention is achieved by providing an optical recording method and control for an overwritable optical recording medium, where data has been recorded on the overwritable optical recording medium. The recorded data is verified, and if the number of errors determined during the verification exceeds a predetermined level, a laser beam's modulation intensity is reset for a re-recording of the data. The reset laser beam intensity is determined by conducting a test recording on a test sector of the recording medium. The data is then re-recorded using this reset laser beam intensity value. The optical recording medium is a magnetooptical recording medium that contains at least two magnetic layers, which are mutually exchange-coupled if the number of cycles of the control indicates that that sector of the recording medium is a bad sector.

Additionally, in modulation overwrite re-recording, the recording and replacing are approximately simultaneously conducted. Thus, it is necessary to conduct both replacement and recording through the modulation of the laser beam intensities. Conventional magnetooptical disks require that data be erased prior to recording. Accordingly, a higher control precision of the laser beam intensities is necessary. Therefore, when the intensity is insufficient, poor replacement of the data occurs. Therefore, a test recording can be conducted, and an optimum modulation intensity of the laser beam can be determined. However, the temperature of the recording medium will change because of temperature changes inside the recording device. Accordingly, the optimum modulation intensity of the laser beam will fluctuate, so errors could be created in a process that computes the optimum modulation intensity. Therefore, when the number of errors exceeds a predetermined level after data verification, the modulation intensity of the laser beam must be reset by conducting such a test recording. By re-recording with this reset value, it is possible to find an exact optimum modulation intensity of the laser beam.

Other objects, advantages and salient features of the invention will become apparent from the following detailed description, which, taken in conjunction with the annexed drawings, discloses preferred embodiments of the invention.

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS

In each of the first–fourth preferred illustrated embodiments (described hereinafter), the control for recording can be implemented as a single special purpose integrated circuit (e.g., ASIC) having a main or central processor sector for overall, system-level control, and separate sectors dedicated to performing various different specific computations, functions and other processes. It will be appreciated by those skilled in the art that the control can also be implemented using a plurality of separate dedicated or programmable integrated or other electronic circuits or devices (e.g., hardwired electronic or logic circuits such as discrete element circuits, or programmable logic devices such as PLDs, PLAs, PALs or the like). The control can also be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowcharts shown in FIGS. 1, 3, 5 and 7 can be used as the control. As shown, a distributed processing architecture is preferred for maximum data/signal processing capability and speed.

Figure 1:
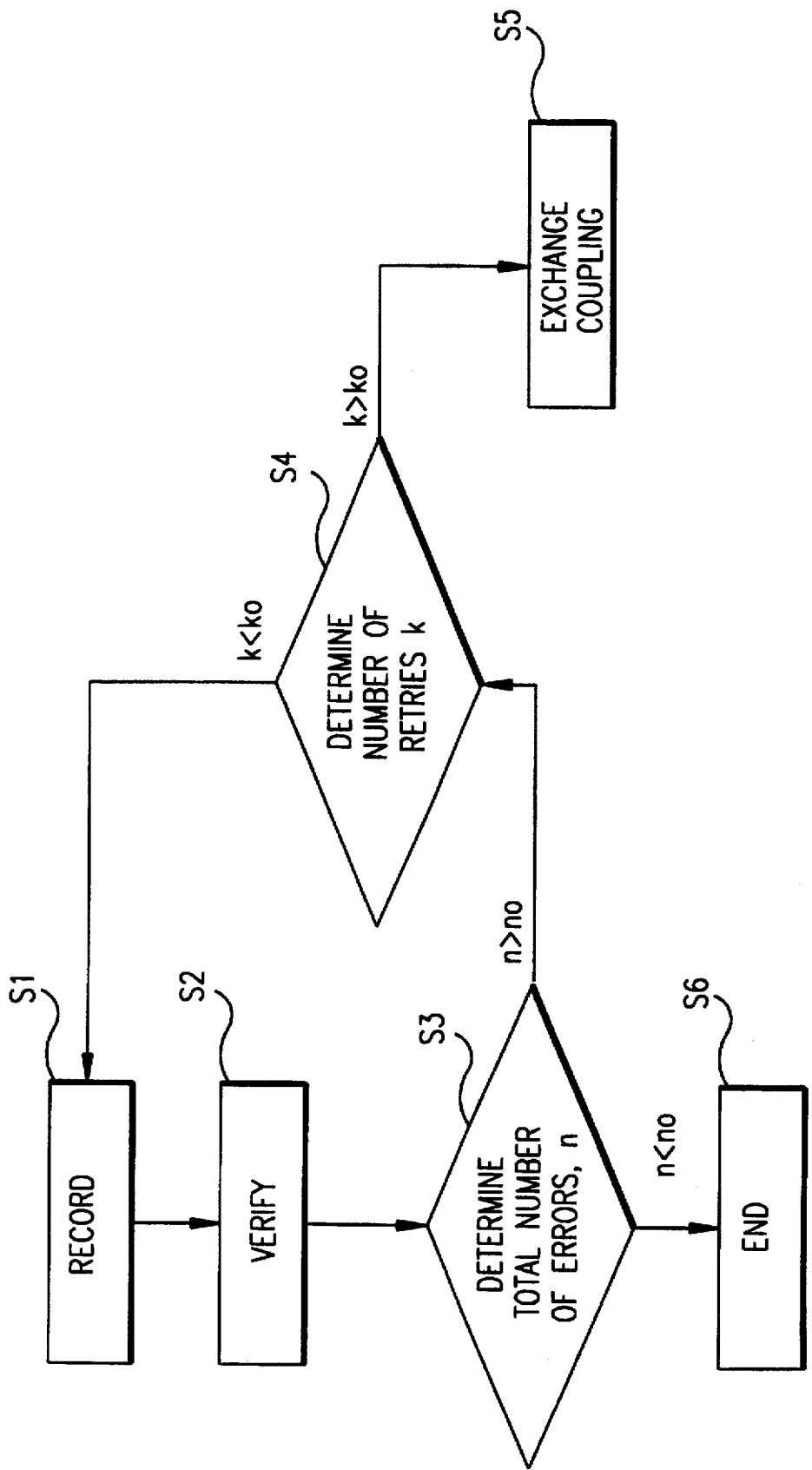
FIG. 1 is a flowchart illustrating an optical recording method and control according to a first preferred embodiment of the invention.
Figure 2:
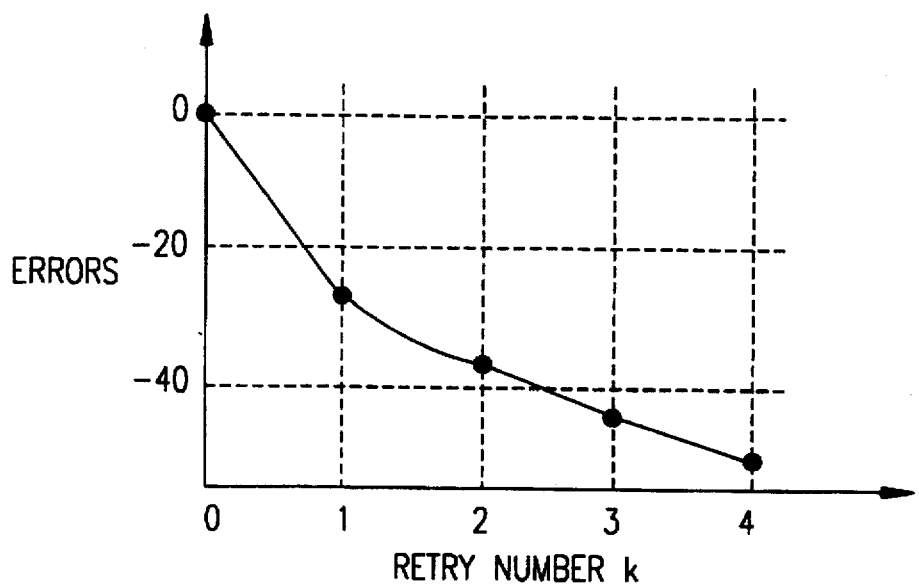
FIGS. 2 is a graph illustrating the replacement of previously recorded data by new data using an optical recording method and control according to the first preferred embodiment.

A control and method for optical recording on an overwritable optical recording medium according to a first preferred embodiment of the invention will be described with reference to FIGS. 1 and 2. FIG. 1 is a flow chart illustrating the method utilized by the control and the steps for the first preferred embodiment. FIG. 2 is a graph illustrating the replacement of data by the method of the first preferred embodiment.

In step S1, data is written on a magnetooptical recording medium, such as a magnetooptical disk with a diameter of 130 mm. This can be the first ever recording of data on the magnetooptical disk or a replacement of previously recorded data, for example, as an appropriate control cycles through the steps, as discussed hereinafter. The magnetooptical disk is constructed with appropriate magnetic layers, such as a memory layer M and a auxiliary recording layer W, to permit overwrite recording and replacement of new data on it by an appropriate method, such as for example, a light modulation process. An appropriate signal, such as a 5 MHz single frequency signal is used to initially record data on the magnetooptical disk. After the data has been recorded on the magnetooptical disk, the data is retrieved and verified in step S2.

In step S3, the total number of errors n determined in the verification step S2 are counted. The errors n may be designated by incomplete replacement of data and the like. If the total number of errors n determined in the verification step S2 is less than a predetermined number of errors $n_0$, the control proceeds to step S6, where the optical recording on the magnetooptical recording medium has satisfactorily replaced the previously recorded data. Accordingly, the process is complete.

However, if the total number of errors n is greater than the predetermined number of errors $n_0$, the process proceeds to step S4. In step S4, the control determines the total number of retries or cycles k. If the total number of cycles k is less than a predetermined number $k_o$, the control returns to step S1 to re-record the data, and cycles through steps S1–S3 again. In the first preferred embodiment, the data that was recorded at the first cycle on the optical recording medium is re-recorded in the same location on the recording medium. This is done without erasing the initially recorded data from the previous step S1. Steps S1–S3 are then conducted until the control determines that the total number of errors is less than the predetermined number of errors $n_0$ at step S3. At that point, the control proceeds to step S6, where the optical recording on the magnetooptical recording medium has satisfactorily replaced the previously recorded data. Accordingly, the process is complete.

However, if the total number of errors n does not become less than the predetermined number of errors $n_0$ prior to predetermined number of cycles $k_o$ being reached, the control then proceeds to step S5. At step S5, the magnetic layers on the magnetooptical recording medium are exchanged-coupled. When the exchange-coupled is conducted in step S5, that portion of the recording medium is determined to be a bad sector. Accordingly, the control does not attempt to use that bad sector for subsequent recording.

Figure 3:
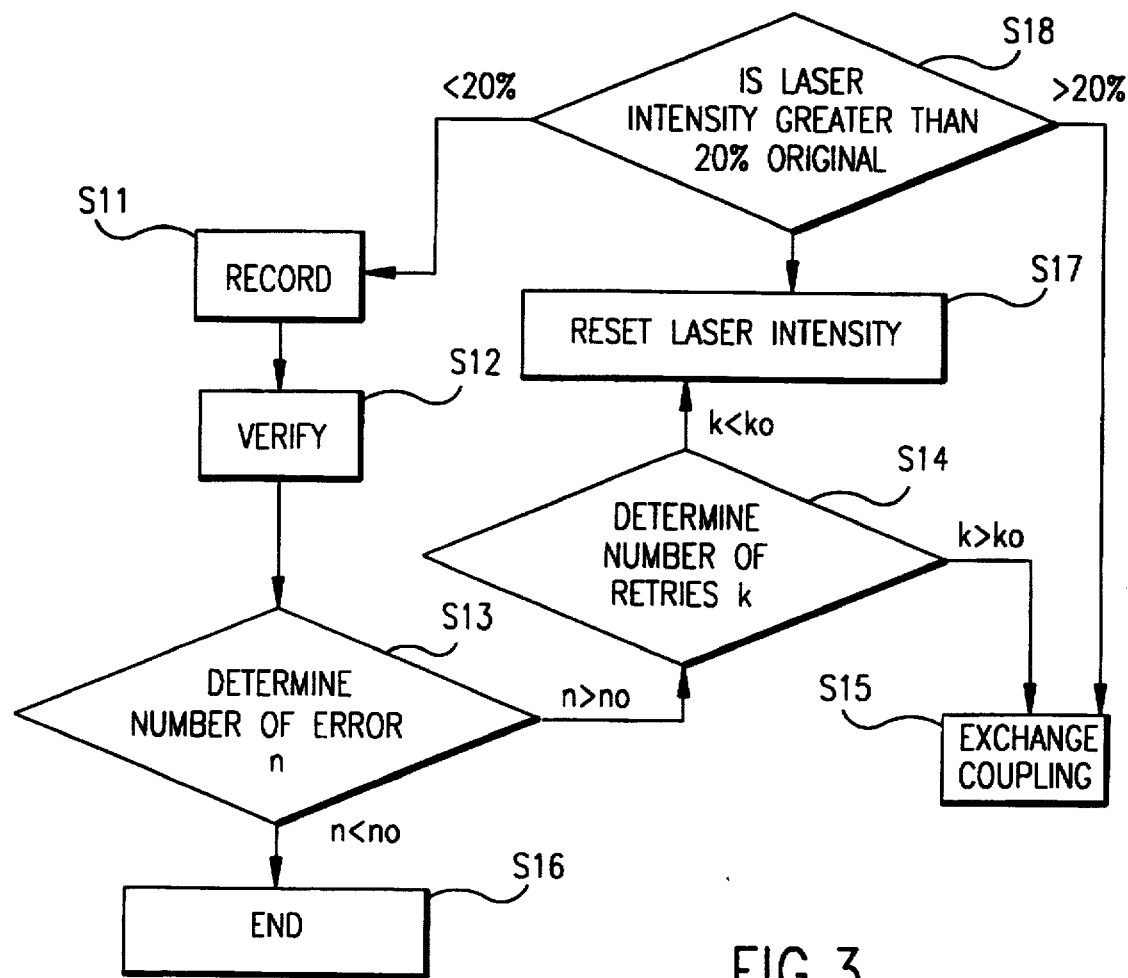
FIG. 3 is a flowchart illustrating an optical recording method according to a second preferred embodiment invention.

Next a description of a second preferred embodiment of the invention will be described, with reference to FIGS. 3 and 4A–4C. FIG. 3 illustrates a flow chart setting forth the steps utilized by a control for the second preferred embodiment. Steps S11–14 are substantially similar to steps S1–4 of the first preferred embodiment.

In step S11, data is written on a magnetooptical recording medium such as a magnetooptical disk. This can be the first ever recording of data on the magnetooptical disk or a replacement of previously recorded data for example, as an appropriate control cycles through the steps, as discussed hereinafter. At step S12, the data, which has been recorded in step S11, is retrieved and verified.

In step S13, the total number of errors n determined in the verification step S12 are counted and determined to be either greater than or less than a predetermined level of errors $n_0$. The errors may be designated by incomplete replacement of data and the like. If the total number of errors n determined in the verification step S12 is less than a predetermined number of errors $n_0$, the control proceeds to step S16, where the optical recording on the magnetooptical recording medium has satisfactorily replaced the previously recorded data. Accordingly, the process is complete.

However, if the total number of errors n is greater than the predetermined number of errors $n_0$, the program proceeds to step S14. In step S14, the control determines the total number of retries or cycles k of the control. If the total number of cycles k is less than a predetermined number $k_o$, the control returns to step S11 to re-record the data, and cycles through steps S11–S13 again. However, according to the second preferred embodiment, at step S11, the data that was first recorded on the optical recording medium is re-recorded at the same location on the recording medium. However, the intensity of the laser beam used to re-record data in step S11 is reset to a different level setting in step S17.

The level laser beam intensity is reset at step S17 by an appropriate predetermined amount, to adequately replace the previously recorded data. For example, the low level laser beam intensity will be incrementally increased at values between 2% to 20% higher for each cycle of the control at step S17, beginning at a laser beam intensity when data was initially recorded. Even more preferably, the lower level laser beam intensity should be 5% to 15% higher. For example, the initial laser beam intensity could be increased 2%, 5%, 10% and 20% at successive cycles through the control. However, this is meant to be an example and in no way limiting of the invention.

The intensity of the laser beam in the second preferred embodiment should not be increased more than 20% from the initial laser beam intensity. If the laser beam intensity is determined at step S18 to have increased greater than 20%, the control proceeds to step S15, where the magnetic layers on the magnetooptical recording medium are exchange-coupled. That sector of the recording medium is determined to be a bad sector. Accordingly, the control does not attempt to record on that bad sector of the recording medium.

If the total number of cycles k is less than the predetermined number of cycles $k_o$, steps S11–S13 are repeated until the total number of errors determined in step S13 is less than the predetermined number of errors $n_0$. If the total number of errors n is less than a predetermined number of errors $n_0$, the control proceeds to step S16, where the optical recording on the magnetooptical recording medium has satisfactorily replaced the previously recorded data. Accordingly, the process is complete.

Figure 4A:
FIGS. 4A–4C illustrate the replacement of previously recorded data by new data using an optical recording method according to the second preferred embodiment.
Figure 4B:
Figure 4C:

FIGS. 4A–4C illustrate the replacement of previously recorded data by new data using an optical recording method according to the second preferred embodiment. FIG. 4A illustrates where the previous data was recorded off-center with respect to a center of the magnetooptical recording medium. FIG. 4B illustrates where a first overwrite recording has been conducted on the recording medium of FIG. 4A. In FIG. 4B, the data from the first recording are not replaced at peripheral portions by the low level laser beam intensity. FIG. 4C illustrates re-recording conducted with an increased level of laser beam intensity, at a level higher than the first step S17. By increasing the level laser beam intensity at step S17, the old data can be substantially replaced as seen in FIG. 4C.

Figure 5:
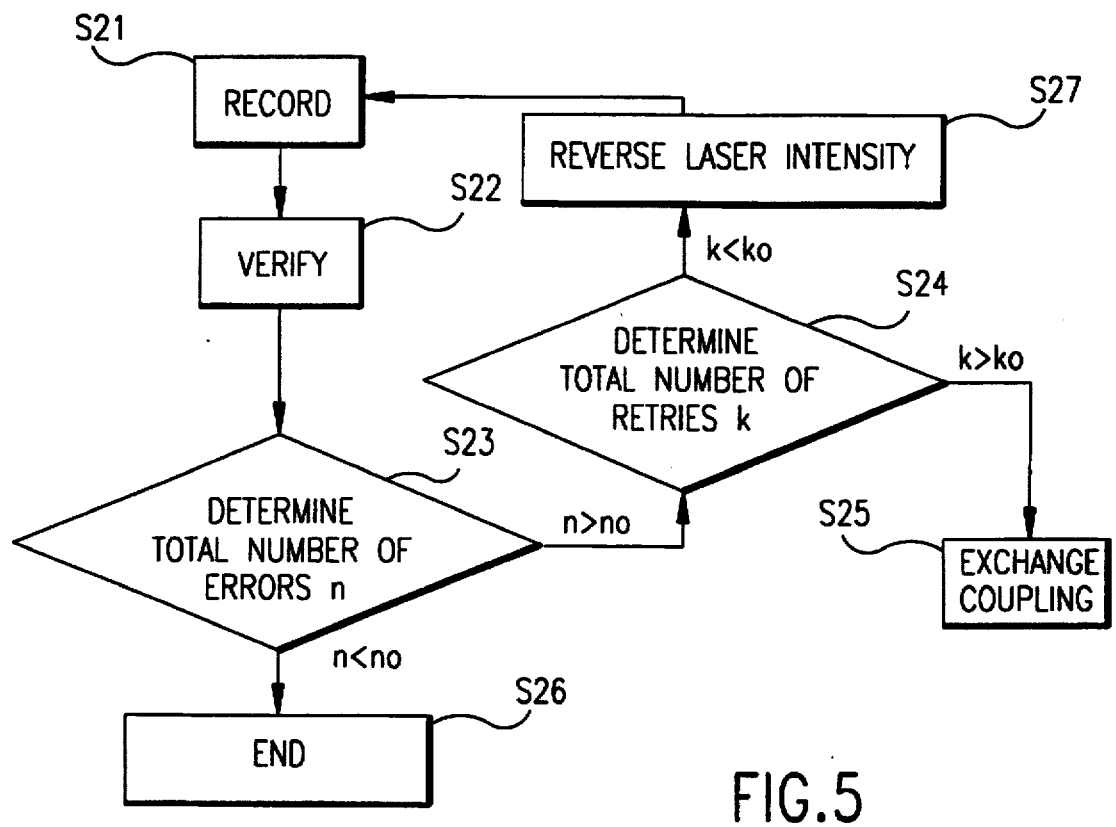
FIG. 5 is a flowchart illustrating an optical recording method and control according to a third preferred embodiment of the invention.

Next, a third preferred embodiment of the invention will be described with reference to FIGS. 5 and 6A–6C. FIG. 5 is a flow chart illustrating the control for an optical recording method on an overwrite optical recording medium.

Steps S21–S24 are substantially similar to steps S1–S4 of the first preferred embodiment. In step S21, data is written on a magnetooptical recording medium such as a magnetooptical disk. This can be the first ever recording of data on a magnetooptical disk or a replacement of previously recorded data for example, if an appropriate control cycles through the steps, as discussed hereinafter. In step S22, the data that had been recorded in step S21 is retrieved and verified.

In step S23, the total number of errors n determined in the verifying step S22, is compared to a predetermined number of errors $n_0$. The errors n may be designated by incomplete replacement of data and the like. If the total number of errors n determined in the verification step S22 is less than a predetermined number of errors $n_0$, the control proceeds to step S26, where the optical recording on the magnetooptical recording medium has satisfactorily replaced the previously recorded data. Accordingly, the process is complete.

However, if the total number of errors n is greater than the predetermined number of errors $n_0$, the control proceeds to step S24. At step S24, the control determines the total number of retries or cycles k of the control. If the total number of cycles k is less than a predetermined number $k_o$, the control returns to step S21 to re-record the data, and cycles through steps S21–S23 again. At step S21, the data that was recorded on the magnetooptical recording medium at the first step S21, is re-recorded at the same location on the magnetooptical recording medium, without erasing the previously recorded data. However, according to the third preferred embodiment of the invention, the laser beam intensity level is reversed at step S27 from the previous recording at step S21 prior to the re-recording of data in step S21. The control then repeats steps S21–S23, until the total number of errors n is less than the predetermined number of errors $n_0$ at step S23. At that point, the control proceeds to step S26, where the optical recording on the magnetooptical recording medium has satisfactorily replaced the previously recorded data. Accordingly, the process is complete.

However, if the total number of errors n does not become less than the predetermined number of errors $n_0$ prior to a predetermined number of cycles $k_o$ being reached, the control then proceeds to step S25. At step S25, the magnetic layers on the magnetooptical recording medium are exchange-coupled. When the exchange-coupled is conducted in step S25, that portion of the magnetooptical recording medium is determined to be a bad sector. Accordingly, the control does not attempt to use that bad sector for subsequent recording.

Figure 6A:
FIGS. 6A–6C illustrate the replacement of previously recorded data by new data using the optical recording method according to the third preferred embodiment.
Figure 6B:
Figure 6C:

FIGS. 6A–6C illustrate the replacement of previously recorded data by new data in accordance with the third preferred embodiment of the invention. FIG. 6A illustrates where the data was previously initially recorded somewhat off-center of a recording track on the magnetooptical recording medium. FIGS. 6B and 6C illustrate the recording with a reversal of the laser beam intensities, in step S27, to substantially replace all previously recorded data. As seen in FIGS. 6A–6C, when data is replaced according to the third preferred embodiment by reversing the laser beam intensity level, the periphery of the new data can be replaced by low temperature process temperature (see U.S. Pat. No. 5,239,524). Thus, all of the previously recorded data is substantially replaced. In particular, this is effective for replacing portions of data that overlap and extend between areas where the data should be recorded.

Figure 7:
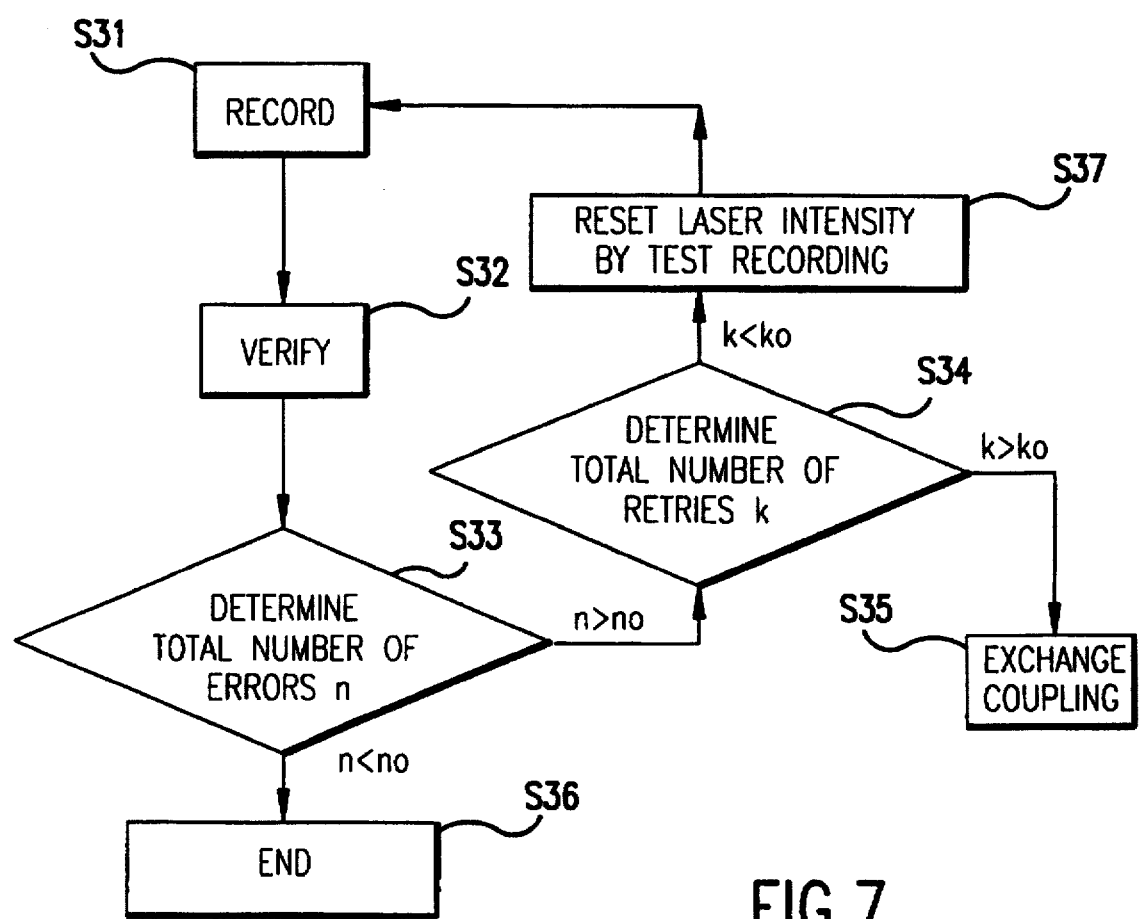
FIG. 7 is a flowchart illustrating an the optical recording method and control according to a fourth preferred embodiment.

A fourth preferred embodiment of the invention will now be described with reference to FIG. 7. FIG. 7 is a flow chart illustrating the control for an optical recording method according to the fourth preferred embodiment. Steps S31–S34 are substantially similar to steps S1–S4 of the first preferred embodiment.

In step S31, data is written on a magnetooptical recording medium, such as a magnetooptical disk. This can be the first ever recording of data or a replacement of previously recorded data for example, if an appropriate control cycles through the steps, as discussed hereinafter. In step S32, the data is retrieved and verified to determine the total number of errors n.

In step S33, the total number of errors n determined in the verification step S32 is compared to a predetermined level of errors $n_0$. If the total number of errors n is less than the predetermined number of errors $n_0$, the control proceeds to step S36, where optical recording on the magnetooptical recording medium has satisfactorily replaced previously recorded data. Accordingly, the process is complete.

However, if the total number of errors n is greater than the predetermined number of errors $n_0$, the control proceeds to step S34. In step S34, the total number of retries or cycles k through the control are determined. If the total number of cycles k is less than a predetermined number $k_o$, the control returns to step S31 to re-record the data and repeat steps S31–S33. At the next step S31, in accordance with the fourth preferred embodiment, prior to the re-recording of data in step S31, the control resets the laser beam modulation intensity, as now described.

The reset laser beam modulation intensity is determined by conducting a test recording in step S37. The control determines a reset laser intensity by conducing a test recording on a test sector of the magnetooptical recording medium. The reset laser intensity according to the test recording is determined by finding a laser beam intensity that satisfactorily replaces data on the magnetooptical recording medium.

Steps S31–S33 are repeated with the reset laser beam intensity until the total number of errors n is less than the predetermined number of errors $n_0$. However, if the total number of errors n does not become less than the predetermined number of errors $n_0$ prior to a predetermined number of cycles $k_o$ being reached, the control then proceeds from step S35. At step S35, the magnetic layers on the magnetooptical recording medium are exchange-coupled. When exchange-coupled is conducted in step S35, that portion of the recording medium is determined to be a bad sector. Accordingly, the control does not attempt to use that bad sector for subsequent recording.

The above first–fourth preferred embodiments rely on a suitable magnetooptical recording medium for recording the data. For example, a magnetooptical disk may have a diameter of 130 mm with at least one overwrite recording area may be used.

The laser beam utilized to record the data in steps S1, S11, S21 and S31 can emit any appropriate signal for recording the data. For example, in the first preferred embodiment, a 5 MHz single frequency signal can be used to initially record data on the magnetooptical disk. A 2 MHz single frequency signal may then be used to replace the 5 MHz data. The errors or remnants the 5 MHz data are measured and a total error amount can be determined. In the first preferred embodiment, this procedure is repeated, and as seen in FIG. 2, the remnants can be plotted.

In the second preferred embodiment, a 5 MHz single frequency signal may be initially used to record on a magnetooptical recording medium. A 2 MHz single frequency signal may then be used to replace the 5 MHz data, with a low level laser beam intensity that is 2–20% higher. This procedure is repeated in steps S11–S13, with the laser beam intensity being incrementally increased by an equivalent amount during each cycle of the control, until it is determined that the 5 MHz signal has been replaced, the increase in the intensity exceeds 20%, or the number of retries k is the larger than a predetermined number k.

In the third preferred embodiment of the invention, a 5 MHz signal may be used to initially record data on the magnetooptical recording medium. A 2 MHz single frequency signal may then be used to replace the 5 MHz data. If the total number of errors n exceeds a predetermined number $n_0$, the low and high level laser beam intensities are reversed. The control repeats these steps until the number of errors n is less than the predetermined number of errors $n_0$ or the total number of cycles k is greater than a predetermined number $k_o$.

In the fourth preferred embodiment of the invention, a 5 MHz signal may be used to initially record data on the magnetooptical recording medium. A 2 MHz single frequency signal may then be used to replace the 5 MHz data. When the number of errors n exceeds the predetermined number of errors $n_0$, an optimum laser beam modulation intensity is determined for re-recording. As discussed above, the optimum laser beam modulation intensity is determined by a test recording on a test recording region of the magnetooptical optical recording medium. The optimum laser beam modulation intensity is then used as the new laser beam modulation intensity for each re-recording step S31, during the next cycles through the control. The control repeats these steps until the number of errors n is less than the predetermined number of errors $n_0$ or the total number of cycles k is greater than a predetermined number $k_o$.

As discussed above, if the control is cycled too many times, the sector that is being recorded on is determined to be a faulty or bad sector. The control does not record data on that sector again. Any further recording is in a different area of the magnetooptical optical recording medium.

While this invention is described in conjunction with specific embodiments thereof, it is evident that many alternatives, modifications and variations will be apparent to those skilled in the art. Accordingly, the preferred embodiments of the invention as set forth in error are tended to be illustrative, not limiting. Various changes may be made without departing from the spirit and scope of the invention as defined in the following claims.

What is claimed is:

1. A method for optically recording data on an optical recording medium, the medium comprising a magnetooptical recording medium having at least two magnetic layers, the layers being adapted to be mutually exchange-coupled, the method comprising:

recording data on an optical recording medium;

verifying the data that is recorded on the optical recording medium;

determining a number of errors in the data that is recorded on the optical recording medium;

re-recording the data, if the determined number of errors is greater than a predetermined number of errors, wherein the re-recording is performed at a same location as initially recorded data without erasing previously recorded data;

determining the number of re-recording steps;

determining whether the total number of determined re-recording steps is greater than a predetermined number of re-recording steps; and designating a sector of the magnetooptical recording medium where recording was attempted as a bad sector, if the total number of determined re-recording steps is greater than the predetermined number of re-recording steps.

2. A method for optically recording data on an optical recording medium, comprising:

recording data on an optical recording medium with a laser beam;

verifying the data that is recorded on the optical recording medium;

determining a number of errors in the data that is recorded on the optical recording medium; and re-recording the data, if the determined number of errors is greater than a predetermined number of errors, wherein the re-recording is performed at a same location as initially recorded data without erasing previously recorded data, the re-recording step includingsetting the laser beam intensity level to a higher intensity than used in the recording step; and then re-recording data without erasing previously recorded data.

3. The method according to claim 2, wherein the optical recording medium comprises a magnetooptical recording medium having at least two magnetic layers, the at least two magnetic layers being adapted to be mutually exchange-coupled.

4. The method according to claim 3, further comprising mutually exchange-coupling the at least two magnetic layers and designating a sector of the magnetooptical recording medium where recording was attempted as a bad sector, if the laser beam intensity is greater than 20% higher than used in a first recording.

5. The method according to claim 2, further wherein the setting of the laser beam intensity is to a level that is 2–20% higher than used in a first recording.

6. The method according to claim 2, further wherein the setting of the laser beam intensity is to a level that is 5–15% higher than used in a first recording.

7. The method according to claim 2, wherein the setting of the laser beam level intensity incrementally increases the laser beam intensity level.

8. A The method for optically recording data on an optical recording medium, comprising:

recording data on an optical recording medium with a laser beam;

verifying the data that is recorded on the optical recording medium;

determining a number of errors in the data that is recorded on the optical recording medium;

re-recording the data, if the determined number of errors is greater than a predetermined number of errors, wherein the re-recording is performed at a same location as initially recorded data without erasing previously recorded data, the re-recording includingreversing a low level and high level laser beam intensity from a previous recording;

and then re-recording the data, if the total number of errors is greater than the predetermined number of errors, without erasing previously recorded data.

9. The method according to claim 8, wherein the optical recording medium comprises a magnetooptical recording medium having at least two magnetic layers, the at least two magnetic layers being adapted to be mutually exchange-coupled.

10. A method for optically recording data on an optical recording medium, comprising:

recording data on an optical recording medium with a laser beam;

verifying the data that is recorded on the optical recording medium;

determining a number of errors in the data that is recorded on the optical recording medium;

re-recording the data, if the determined number of errors is greater than a predetermined number of errors, wherein the re-recording is performed at a same location as initially recorded data without erasing previously recorded data, the re-recording includingresetting a laser beam modulation intensity, if the total number of errors is greater than the predetermined number of errors, and then re-recording without erasing previously recorded data, wherein the reset laser beam modulation intensity is determined by conducting a test recording on a test sector of the recording medium.

11. The method according to claim 10, wherein the optical recording medium comprises a magnetooptical recording medium having at least two magnetic layers, the at least two magnetic layers being adapted to be mutually exchange-coupled.

12. A control for optically recording data on an optical recording medium, the medium comprising a magnetooptical image recording medium having at least two layers being adapted to be mutually exchange-coupled, comprising:

means for recording data on an overwritable optical recording medium;

means for verifying the data recorded on the optical recording medium;

means for determining the total number of errors in the data recorded on the recording medium;

means for re-recording the data if the total number of errors is greater than a predetermined number of errors without erasing previously recorded data;

means for determining the number of re-recording steps; and means for determining whether the total number of determined re-recording steps is greater than a predetermined number of re-recording steps; wherein, if the total number of determined re-recording steps is greater than the predetermined number of re-recording steps, designating a sector of the magnetooptical recording medium where recording was attempted as a bad sector.

13. A control for optically recording data on an optical recording medium comprising a magnetooptical recording medium having at least two magnetic layers being adapted to be mutually exchange-coupled comprising:

means for verifying the data recorded on the optical recording medium with a laser beam;

means for determining the total number of errors in the data recorded on the recording medium;

means for re-recording the data if the total number of errors is greater than a predetermined number of errors without erasing previously recorded data; and means for determining if the laser beam intensity is greater than 20% higher than the first recording step, and means for mutually exchange-coupling and designating that sector of the magnetooptical recording medium as a bad sector when the laser beam intensity has been increased greater than 20%.

14. A method for optically recording data on an optical recording medium, comprising:

recording data on an optical recording medium with a laser beam;

verifying the data that is recorded on the optical recording medium;

determining a number of errors in the data that is recorded on the optical recording medium; and re-recording the data, if the determined number of errors is greater than a predetermined number of errors, wherein the re-recording is performed at a same location as initially recorded data without erasing previously recorded data, the re-recording step includingsetting a low level laser beam intensity level to a higher intensity than used in the recording step; and then re-recording data without erasing previously recorded data.

15. The method according to claim 14, wherein the optical recording medium comprises a magnetooptical recording medium having at least two magnetic layers, the at least two magnetic layers being adapted to be mutually exchange-coupled; and further comprising mutually exchange-coupling the at least two magnetic layers and designating a sector of the magnetooptical recording medium where recording was attempted as a bad sector, if the low level laser beam intensity is greater than 20% higher than used in a first recording.

16. The method according to claim 14, further wherein the setting of the low level laser beam intensity is to a level that is 2–20% higher than used in a first recording.

17. The method according to claim 14, wherein the setting of the low level laser beam level intensity incrementally increases the low level laser beam intensity level.

18. A control for optically recording data on an optical recording medium comprising a magnetooptical recording medium having at least two magnetic layers being adapted to be mutually exchange-coupled comprising:

means for verifying data recorded on the optical recording medium with a laser beam;

means for determining the total number of errors in the data recorded on the recording medium;

means for re-recording the data with a low-level intensity laser beam if the total number of errors is greater than a predetermined number of errors without erasing previously recorded data; and means for adjusting the intensity of the low level intensity laser beam;

means for determining if the low level laser beam intensity is greater than 20% higher than that used for recording the data on the recording medium; and means for mutually exchange-coupling and designating that sector of the magnetooptical recording medium as a bad sector when the low level laser beam intensity has been increased greater than 20%.

* * * * *